United States Patent
Schoenfelder et al.

(10) Patent No.: US 9,694,923 B2
(45) Date of Patent: Jul. 4, 2017

(54) CLOSER FOR CONTAINERS

(71) Applicant: KRONES AG, Neutraubling (DE)

(72) Inventors: Markus Schoenfelder, Regensburg (DE); Stefan Poeschl, Sinzing (DE)

(73) Assignee: KRONES AG, Neutraubling (DE)

(*) Notice: Subject to any disclaimer, the term of this patent is extended or adjusted under 35 U.S.C. 154(b) by 681 days.

(21) Appl. No.: 13/886,828

(22) Filed: May 3, 2013

(65) Prior Publication Data
US 2013/0333325 A1 Dec. 19, 2013

(30) Foreign Application Priority Data
Jun. 13, 2012 (DE) .................. 10 2012 209 905

(51) Int. Cl.
| | |
|---|---|
| B65B 7/28 | (2006.01) |
| B67B 3/20 | (2006.01) |
| H02K 5/128 | (2006.01) |
| H02K 16/00 | (2006.01) |
| H02K 41/03 | (2006.01) |
| H02K 21/14 | (2006.01) |
| H02K 21/22 | (2006.01) |

(52) U.S. Cl.
CPC .......... *B65B 7/2871* (2013.01); *B67B 3/2066* (2013.01); *H02K 5/1282* (2013.01); *H02K 16/00* (2013.01); *H02K 41/03* (2013.01); *B67B 2201/08* (2013.01); *H02K 21/14* (2013.01); *H02K 21/22* (2013.01); *H02K 2201/18* (2013.01)

(58) Field of Classification Search
CPC ...... B67B 3/20; B67B 3/2066; B67B 2201/08
USPC .... 53/317, 331.5; 310/68 B, 156.01–156.56, 310/256–266
See application file for complete search history.

(56) References Cited

U.S. PATENT DOCUMENTS

| | | | | |
|---|---|---|---|---|
| 5,313,765 | A * | 5/1994 | Martin | ................. B67B 3/2086 53/317 |
| 5,404,983 | A * | 4/1995 | Eicher | ..................... B25J 9/101 192/139 |
| 6,087,751 | A * | 7/2000 | Sakai | ..................... H02K 1/246 310/156.56 |
| 6,304,014 | B1 * | 10/2001 | England | .............. G01D 5/2073 310/68 B |

(Continued)

FOREIGN PATENT DOCUMENTS

| | | |
|---|---|---|
| DE | 202004017199 U1 | 3/2005 |
| DE | 102007015845 A1 | 10/2008 |

(Continued)

OTHER PUBLICATIONS

European Search Report for Application No. 13160602 dated Sep. 26, 2013.

(Continued)

*Primary Examiner* — Hemant M Desai
*Assistant Examiner* — Valentin Neacsu
(74) *Attorney, Agent, or Firm* — Marshall, Gerstein & Borun LLP

(57) ABSTRACT

A closer for containers, in particular bottles, with a closing head acting in a clean room and with an electric motor comprising at least one rotor and at least one stator, with the closing head connected with the rotor, and an element for clean room separation is formed between the rotor and the stator.

15 Claims, 3 Drawing Sheets

(56) References Cited

U.S. PATENT DOCUMENTS

| | | | | |
|---|---|---|---|---|
| 2002/0047317 A1* | 4/2002 | Dawson | ............... | H02K 7/125 310/12.14 |
| 2004/0108493 A1* | 6/2004 | Ortmeier | ............ | B23Q 1/4876 254/1 |
| 2005/0150193 A1* | 7/2005 | Bernhard | ............. | B67B 3/2033 53/490 |
| 2005/0212367 A1* | 9/2005 | Blase | ................. | F02M 37/08 310/68 B |
| 2007/0053781 A1* | 3/2007 | Davis | ................. | A61M 1/101 417/423.1 |
| 2008/0100151 A1* | 5/2008 | Takeuchi | ............ | H02K 21/12 310/12.14 |
| 2008/0284256 A1* | 11/2008 | Budde | ................ | B29C 45/5008 310/12.14 |
| 2009/0007698 A1* | 1/2009 | Budde | ................ | H02K 21/222 73/862.627 |
| 2009/0255214 A1* | 10/2009 | Schussler | ............. | B67B 3/261 53/331.5 |
| 2009/0309441 A1* | 12/2009 | Yang | ................. | H02K 29/08 310/91 |
| 2010/0097053 A1* | 4/2010 | Kikuchi | ............ | H02K 11/0031 324/207.25 |
| 2010/0147833 A1* | 6/2010 | Buehrer | ................ | H02K 55/04 219/647 |
| 2010/0212259 A1* | 8/2010 | Knieling | ............... | B67B 3/2033 53/285 |
| 2010/0307110 A1* | 12/2010 | Wilhelm | ................. | B67B 3/12 53/329.2 |
| 2011/0175478 A1* | 7/2011 | Sakai | ................. | H02K 1/2766 310/156.01 |
| 2012/0079792 A1* | 4/2012 | Kampmann | ......... | B67B 3/2013 53/285 |

FOREIGN PATENT DOCUMENTS

| | | |
|---|---|---|
| DE | 102007057857 A1 | 6/2009 |
| EP | 1186873 A1 | 3/2002 |
| EP | 2221272 A2 | 8/2010 |
| WO | WO-2007028509 A1 | 3/2007 |
| WO | WO-2010052124 A1 | 5/2010 |
| WO | WO-2010118806 A2 | 10/2010 |

OTHER PUBLICATIONS

German Search Report for Application No. 10 2012 209 905.0, dated Mar. 1, 2013.

Notice of Opposition, European patent No. EP 2 674 390 B1, mailing date Jan. 26, 2016.

* cited by examiner

CLOSER FOR CONTAINERS

CROSS-REFERENCE TO RELATED APPLICATION

The present application claims the benefit of priority of German Application No. 10 2012 209 905.0, filed Jun. 13, 2012. The entire text of the priority application is incorporated herein by reference in its entirety.

FIELD OF THE DISCLOSURE

The disclosure relates to a closer for containers, in particular bottles, with a closing head acting in a clean room and with an electric motor comprising at least one rotor and at least one stator.

BACKGROUND

As is well-known, screw caps of containers, for example bottles, can be closed in rotary machines with several circumferentially arranged closers rotating about a common axle, the closing caps each being held in a closing head and rotated as well as lowered corresponding to the thread pitch after having been placed onto the respective bottle mouth. As an alternative, the containers can also be correspondingly lifted while the closing cap is being screwed on. The rotary motion of the closing head is here accomplished by means of an electric motor, and the lowering motion either by a control cam or by a linear motor.

In many applications, the containers are guided in the filling line and in the closer within a clean room to save agents for conservation, pasteurization, etc. on the one hand, and to be able to fill the containers with particularly germ-sensitive products on the other. Moreover, the containers and the products filled into it can be protected from leakages of the drive elements in such a clean room. To further reduce the amount of germs and soiling in the clean room, as many components of the closer as possible are disposed outside the clean room.

For this purpose, EP 2 221 272 A2 discloses a device for closing containers by contactless torque generation. Here, a rotary machine with several closers is disclosed, where each torque of a motor disposed outside a clean room is transmitted contactlessly to a closing head within the clean room by means of a magnetic coupling. The lifting motion of the closing heads is here effected via a control cam within the clean room.

Analogously, WO 2010/118806 discloses a closer for screw caps or closures where a drive is hermetically separated from the closing head by a magnetic coupling.

This has the disadvantage that such magnetic couplings involve a corresponding cost factor and that the magnetic couplings must be dimensioned to be correspondingly large for transmitting the required forces, and thus the masses to be moved have disadvantageous effects on the drive system.

SUMMARY OF THE DISCLOSURE

It is one aspect of the present disclosure to provide a closer for containers with a closing head acting in a clean room where the moving masses are reduced and which is less expensive to manufacture. It is another aspect of the present disclosure to provide a closer for containers wherein the penetration of soiling and/or germs into a clean room is reduced.

These and other aspects of the disclosure are achieved with a closer for containers having features where the closing head is connected to the rotor of an electric motor and an element for clean room separation is formed between the rotor and the stator.

By the closing head being connected with the rotor of the electric motor, the forces corresponding to the design of the closer can act directly from the magnetic field of the stator upon the rotor and thus be transmitted to the closing head. Thus, the forces do not have to be transmitted via an expensive magnetic coupling of large dimensions, and the moving masses are thus reduced. Simultaneously, the element formed for clean room separation between the stator and the rotor prevents the penetration of soiling and germs into the clean room. Here, the magnetic field acts upon the rotor through the element for clean room separation. In other words, the clean room is hermetically separated from the surrounding area by the element disposed between the stator and the rotor, and thus the separation between the clean room and the surrounding area is disposed within the electric motor. Additionally, a sealing of the clean room is achieved in this way, whereby sealing devices, such as shaft sealing rings or siphon sealings, can be additionally eliminated.

The containers can in particular comprise plastic bottles, glass bottles, cans and/or tubes. The containers can contain beverages, food, sanitary products, pastes, chemical, biological and/or pharmaceutical products. The closer is particularly suited for closing PET bottles having a collar at which they are supportively held at least during filling and closing. This is the case in particular when microbiologically sensitive products to be filled are filled in cold-aseptic filling lines. The containers can comprise a bottle mouth for screwing on the closing cap. Other closures, such as snap-on closures or crown caps, for example, are also conceivable.

The containers can be treated in the closer in a clean room. A clean room can be a region with reduced germs or particles of dirt. The clean room can have an overpressure with respect to the surrounding area.

The electric motor can be connected with an open-loop or closed-loop motor control. The electric motor can be a brushless direct current or three-phase motor. The rotor can be the armature of the electric motor and/or the rotor of a linear motor. The stator can be an arrangement of several electromagnets surrounding the rotor. The electromagnets can each be coils which are in particular wound around a ferromagnetic core. The stator can be longer in the longitudinal direction than the rotor.

In the closer for containers, the stator can be formed for generating a lifting and/or a rotary magnetic field. Thereby, both a rotary force causing the rotor to rotate about an axis, and a linear force causing the rotor to be shifted along this axis can be exerted on the rotor by the magnetic field. Lifting magnetic field can mean that the magnetic field can be controlled such that it causes the lifting as well as the lowering of the rotor. Rotary magnetic field can mean that the magnetic field can be controlled such that the rotor alternatively rotates in both senses of rotation around the axis. Equally, a rotary motion and a linear motion of the rotor about the axis can be simultaneously caused.

In the closer for containers, a first stator for generating a lifting magnetic field, and a second stator for generating a rotary magnetic field can be formed. Thereby, a simpler design of the stators and a simpler control can be achieved. Here, the one stator can be disposed within the rotor, and the other stator outside the rotor.

In the closer for containers, the element for clean room separation can be of a non-magnetizing material. Thereby, the magnetic field of the stator is influenced as little as possible by the element for clean room separation. For example, the element for clean room separation can consist of plastics, titanium, aluminum, austenitic steel, or composite fiber materials. The element for clean room separation can have a cylindrical shape. Equally, the element for clean room separation can consist of several cylindrical elements inserted one into the other, in particular if several stators and/or several rotors are employed.

In the closer for containers, the rotor can be arranged to be rotating and/or shiftable in relation to the stator and with respect to an axis. Thus, the rotor can perform a linear motion as well as a rotary motion. The rotor can be connected to an axle element which is in particular connected to the closing head. The rotor and/or the axle element can be held in bearings. Thereby, a precise movement of the rotor can be achieved.

In the closer for containers, the rotor can comprise a plurality of permanent magnets, the latter in particular having changing polarities in the circumferential direction. Thereby, the magnetic field of the stator causes a force upon the rotor.

In the closer for containers, the rotor can comprise a plurality of coil elements, the coil elements being in particular short-circuited. Here, the magnetic field of the stator induces currents in the coil elements of the rotor. The currents in the coil elements in turn generate a magnetic field of the rotor which exerts a force upon the rotor in combination with the magnetic field of the stator.

In the closer for containers, the electric motor can be formed as a servomotor. Servomotor can mean here that the electric motor cooperates with a control system, so that in particular the acceleration, the speed, the torque and/or the position of the rotor can be controlled. The control system can control the rotation and/or the linear motion of the rotor. Thereby, a more precise movement of the rotor and thus of the closing head can be effected.

In the closer for containers, at least one sensor for detecting the angle and/or position of the rotor can be associated with the electric motor. Thereby, the precise position and rotation of the rotor can be detected. The sensor can send position and/or angle signals to a control system. The sensor can be an incremental and/or an absolute encoder. The sensor can emit pulses corresponding to the changes of the position and/or the angle of the rotor. The sensor can work with magnetic scanning.

In the closer for containers, the sensor can comprise an inner part connected to the rotor and an outer part connected to the stator, and between the inner part and the outer part, a second element for clean room separation can be arranged. The inner part can comprise a plurality of magnetic scanning elements. The outer part can comprise at least one sensor element for magnetic fields. The sensor element can be a Hall sensor.

BRIEF DESCRIPTION OF THE DRAWINGS

Further features and advantages of the disclosure will be illustrated below with reference to the embodiments represented in the Figures. In the drawings.

DETAILED DESCRIPTION OF THE PREFERRED EMBODIMENT

Figure 1:
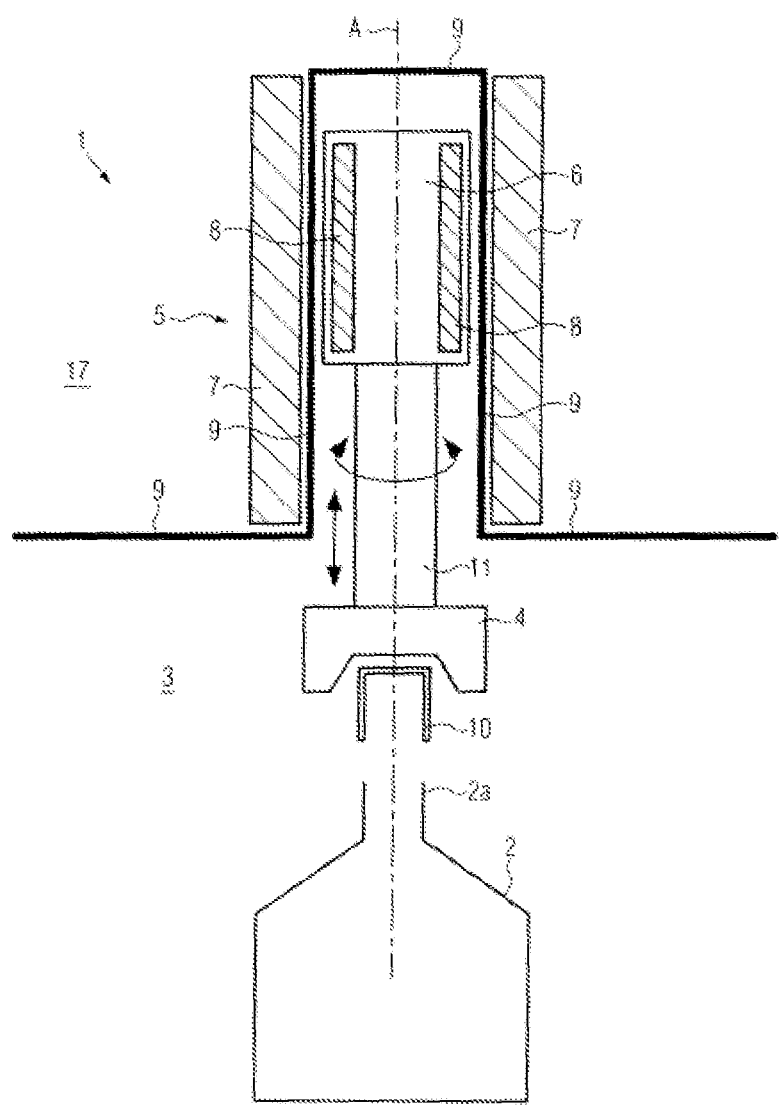
FIG. 1 shows a representation of a closer in a lateral sectional view.

FIG. 1 shows a representation of a closer 1 in a lateral sectional view. Here, an electric motor 5 moves the closing head 4 via an axle element 11. The closing head 4 first picks up a closing cap 10 and screws the latter onto the container mouth 2a of the container 2 via a lowering rotary motion. The container 2 represented here is a bottle.

The electric motor 5 is here embodied as a three-phase motor and comprises a stator 7 and a rotor 6 between which an element for clean room separation 9 is formed. This element for clean room separation 9 is here formed as a housing-like shell of non-magnetic plastics and has the shape of a cylinder closed on one side with a rotational symmetry around the axle A. By the element for clean room separation 9, the clean room 3 is thus hermetically separated from the surrounding area 17. Thus, no lubricants from drive units, no particles of dirt and no germs can penetrate from the surrounding area 17 into the clean room 3. Equally, no pressure can escape from the clean room 3 to the surrounding area 17.

The stator 7 is designed such that it generates a lifting and a rotary magnetic field with respect to the axis A. For this, the stator 7 has a plurality of electromagnets which can generate magnetic fields of different directions and strengths both in the circumferential direction and along the axis A. The magnetic field distribution is controlled via a control system (not represented here) of the electromagnets. In other words, for example, three electromagnets are arranged in the circumferential direction (in a section perpendicular to the axis A), and nine electromagnets are arranged in the longitudinal direction in a section along the axis A. Thus, the stator 7 in this example comprises altogether 3×9=27 electromagnets. Thus, a lifting or rotary magnetic field can be generated to perform the desired movement of the rotor 6 and thus of the closing head 4.

The rotor 6 is arranged within the element for clean room separation 9. The rotor 6 is in this case encapsulated or surrounded by a welded fluid-tight shell to protect it from aggressive cleansing agents, and it is arranged to be rotating and shiftable in relation to the stator 7 and with respect to the axis A. For the rotor 6 to be always located in the region of the magnetic field of the stator 7, the stator 7 is designed to be longer in the direction of the axis A than the rotor 6. A plurality of permanent magnets 8 is located on the rotor 6. The permanent magnets have changing polarities in the circumferential direction. Thereby, the position of the rotor 6 with respect to the axis A can be controlled with the magnetic field applied to the stator 7, the closing head 4 thus performing the desired rotary or lifting or lowering motion. The rotor 6 is secured against falling down in case of a failure of the power supply by (non-depicted) securing devices.

In the closer represented in FIG. 1, thus no additional magnetic coupling is required for exerting the forces of a drive unit onto the closing head 4 within the clean room 3. Thereby, the electric motor 5 only has to move a smaller inert mass, and the electric motor 5 can have correspondingly smaller dimensions. This also results in corresponding cost advantages for the manufacture of the closer. By the hermetic separation of the clean room 3 formed between the stator 7 and the rotor 6, furthermore no germs or soiling can penetrate from the surrounding area 17 into the clean room 3. A contamination of the product in the container 2 can thus be avoided during closing.

Figure 2:
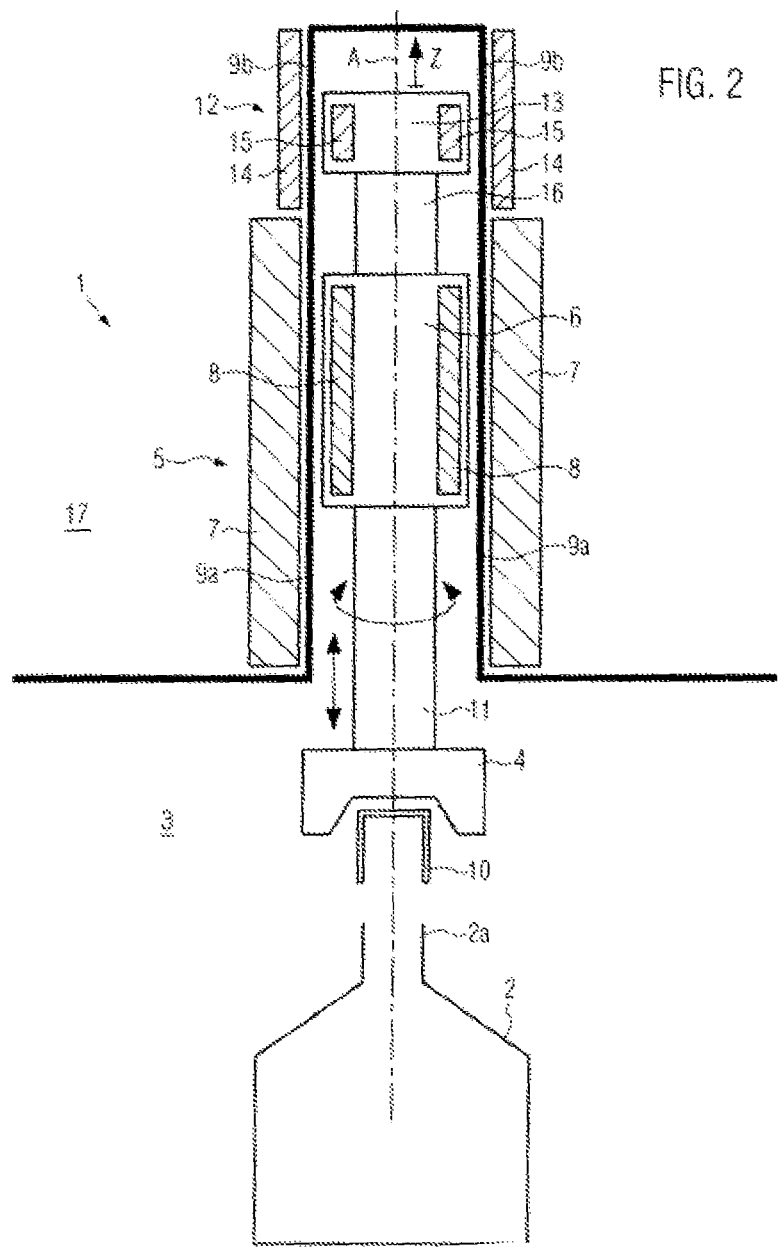
FIG. 2 shows a representation of the closer shown in FIG. 1 with an additional sensor for the position detection of a rotor in a lateral sectional view.

FIG. 2 shows a representation of the closer 1 shown in FIG. 1 with an additional sensor 12 for the position detection of the rotor 6 in a lateral sectional view. Here, the arrangement of the closer 1 has the same design as in FIG. 1, except for the sensor 12. Here, the sensor 12 is disposed above the electric motor 5.

The sensor 12 has an inner part 13 connected to the rotor 6 and an outer part 14 connected to the stator 7, wherein a second element for clean room separation 9b is disposed between the inner part 13 and the outer part 14, which is in particular directly connected with a first element for clean room separation 9a between the rotor 6 and the stator 7. In other words, the two elements for clean room separation 9a and 9b for the electric motor 5 and the sensor 12 are integrally formed. Thereby, in the region of the sensor 12, too, a hermetic separation of the clean room 3 from the surrounding area 17 is achieved, where here, neither any soiling and/or germs can penetrate from the surrounding area 17 into the clean room 3. Moreover, no pressure compensation can take place between the clean room 3 and the surrounding area 17.

Here, on the inner part 13, a plurality of magnetic scanning elements 15 with different magnetic polarities are located; this is the case both in the circumferential direction and in the longitudinal direction with respect to the axis. The outer part 14 here has a plurality of sensor elements by which the exact longitudinal position in the Z-direction and the exact angular position of the rotor 6 with respect to the axis A can be detected. The sensor elements are here embodied as Hall sensors and thus detect the position of the magnetic scanning elements 15.

The sensor 12 emits a signal to a control system (not represented here) which thereby exactly calculates position data of the rotor 6. By a control loop (for example with a PID control), the magnetic field of the stator 7 is now adjusted such that the desired movement of the rotor 6 and thus of the closing head 4 is effected. Simultaneously, the open-loop control system receives commands for the trajectory of the closing head 4 from a central closed-loop control system (not represented here).

By the arrangement with a sensor shown in FIG. 2, the movement of the closing head 4 can be controlled even more precisely than in the embodiment shown in FIG. 1.

Figure 3:
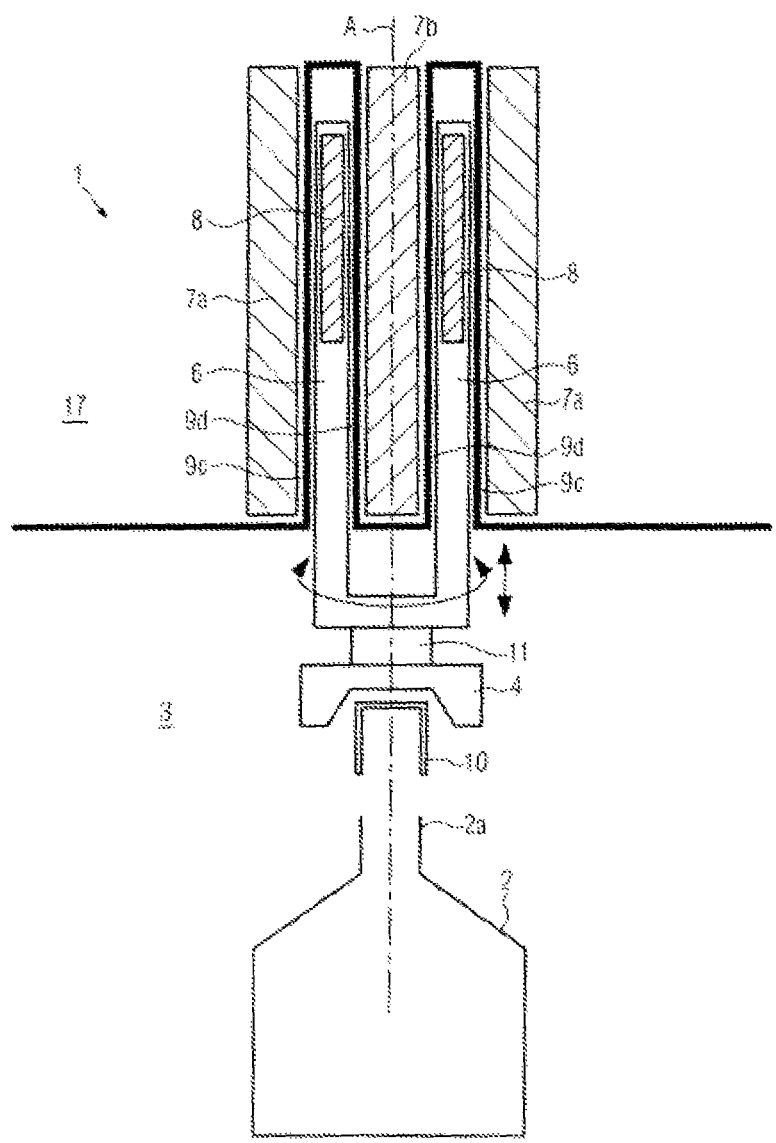
FIG. 3 shows a representation of a closer with two stators in a lateral sectional view.

FIG. 3 shows a representation of a closer 1 with two stators 7a, 7b in a lateral sectional view. Here, the lifting magnetic field for the rotor 6 is generated with the first stator 7a, and the rotary magnetic field is generated with the second stator 7b.

One can see that the rotor 6 in FIG. 3 has a hollow cylindrical shape which is rotationally symmetric around the axis A. The permanent magnets 8 are located at the upper end of the rotor 6. By means of the stator 7a, a force can be exerted onto the permanent magnets 8, so that the rotor 6 will move up and down along the axis A. Additionally, a force can be exerted onto the rotor 6 with the second stator 7b, so that the rotor 6 rotates about the axis A. As an alternative, the externally arranged first stator 7a could also generate the rotary magnetic field, and the internally arranged second stator 7b could generate the lifting magnetic field.

Between the two stators 7a and 7b, an element for clean room separation 9c, 9d is disposed. Here, the part 9c is located between the first stator 7a and the rotor 6, and the part 9d is located between the second stator 7b and the rotor 6. The two parts 9c and 9d of the element for clean room separation are formed as concentric cylinders which are connected to each other at their upper and bottom sides by plane parts such that they hermetically separate the clean room 3 from the surrounding area 17. Thus, no soiling and/or germs can penetrate from the surrounding area 17 into the clean room 3, and neither can any pressure escape from the clean room 3 into the surrounding area 17.

By the arrangement shown in FIG. 3, thus the movement of the closing head 4 can be controlled via the axle element 11 by means of the movement of the rotor 6, such that the closing head 4 screws the closing cap 10 onto the container mouth 2a with a lowering rotary motion, and after the closing operation has been completed, departs again completely from the closing cap at least by a lifting motion.

By the arrangement in FIG. 3, the lifting and the rotary magnetic fields can be activated separately, thus facilitating control.

In another embodiment (not shown), the simple design of the electric motor 5 of FIG. 1 is combined with the elements for clean room separation 9c and 9d of FIG. 3 for combined lifting and rotary motions of the closing head by means of a stator and a rotor. In other words, in the embodiment shown in FIG. 3, the outer stator 7a can be eliminated if the second stator 7b simultaneously generates the lifting and the rotary magnetic fields for the shifting and rotary motions. Here, too, the rotor 6 is designed as a hollow cylinder and surrounds the stator 7b. Thereby, the advantages of a combined lifting and rotary drive can be utilized, where additionally the element for clean room separation 9c serves as a mechanical protection of the electric motor.

Several ones of the closers 1 represented in FIGS. 1-3 can be arranged in a rotary machine, where they can be arranged to be uniformly distributed on a periphery of the rotary machine and aligned with container treatment spaces disposed on the rotary machine, thus permitting a continuous operation of the rotary machine.

It will be understood that features mentioned in the above described embodiments are not restricted to these special combinations and are also possible in any other combinations.

The invention claimed is:

1. A closer for containers, the closer comprising:
  a closing head acting in a clean room; and
  an electric motor comprising at least one rotor and only one stator; wherein
    an element for clean room separation is formed between the rotor and the stator;
    the closing head and the rotor being connected and positioned on a first side of the element for clean room separation;
    the one stator being positioned on a second side of the element for clean room separation, opposite the first side, the one stator comprising a plurality of electromagnets that generate magnetic fields both along an axis and in a circumferential direction around the axis so that the magnetic fields exhibit both properties of being a lifting magnetic field along the axis and a rotary magnetic field around the axis at the same time;
    the stator and the element for clean room separation being rotationally and axially fixed relative to the axis and
    the rotor is rotatable and shiftable in relation to the one stator and with respect to the axis.

2. The closer for containers according to claim 1, wherein the element for clean room separation is made of a non-magnetizing material.

3. The closer for containers according to claim 1, wherein the rotor comprises a plurality of permanent magnets.

4. The closer for containers according to claim 3, wherein the permanent magnets have polarities that change in a circumferential direction.

5. The closer for containers according to claim 1, wherein the electric motor is a servomotor.

6. The closer for containers according to claim 1, wherein at least one sensor for at least one of an angle and a position detection of the rotor is associated with the electric motor.

7. The closer for containers according to claim 6, wherein the sensor comprises an inner part connected with the rotor and an outer part connected with the stator, and a second element for clean room separation is arranged between the inner and the outer parts.

8. The closer for containers according to claim 1, wherein the containers are bottles.

9. A closer for containers, the closer comprising:
a closing head acting in a clean room; and
an electric motor comprising a rotor, a first stator, and a second stator; wherein
the first stator generates a lifting magnetic field that exerts a force on the rotor, moving the rotor along an axis;
the second stator generates a rotary magnetic field that exerts a force on the rotor, rotating the rotor about the axis;
one of the first stator and the second stator is located in an exterior space of the rotor, radially outward from the rotor in relation to a radial direction perpendicular to the axis, and the other one of the first stator and the second stator is located in an interior space of the rotor, radially inward from the rotor in relation to the radial direction;
an element for clean room separation is formed between the rotor and both the first stator and the second stator;
the closing head is connected to the rotor and positioned on a first side of the element for clean room separation;
the first stator and the second stator being positioned on a second side of the element for clean room separation, opposite the first side, the first stator, second stator and element for clean room separation being rotationally and axially fixed relative to the axis; and
the rotor is rotatable and shiftable in relation to both the first stator and the second stator.

10. The closer for containers according to claim 9, wherein the element for clean room separation is made of a non-magnetizing material.

11. The closer for containers according to claim 9, wherein the rotor comprises a plurality of permanent magnets.

12. The closer for containers according to claim 11, wherein the permanent magnets have polarities that change in a circumferential direction.

13. The closer for containers according to claim 9, wherein the electric motor is a servomotor.

14. The closer for containers according to claim 9, wherein at least one sensor for at least one of an angle and a position detection of the rotor is associated with the electric motor.

15. The closer for containers according to claim 9, wherein the containers are bottles.

* * * * *